(12) United States Patent
Smith, Jr.

(10) Patent No.: US 8,763,951 B2
(45) Date of Patent: Jul. 1, 2014

(54) CARGO ORIENTED PERSONAL AIRCRAFT

(76) Inventor: Frank C. Smith, Jr., Houston, TX (US)

( * ) Notice: Subject to any disclaimer, the term of this patent is extended or adjusted under 35 U.S.C. 154(b) by 836 days.

(21) Appl. No.: 10/701,146

(22) Filed: Nov. 4, 2003

(65) Prior Publication Data

US 2005/0103934 A1    May 19, 2005

(51) Int. Cl.
 *B64C 39/12* (2006.01)
 *B64C 1/22* (2006.01)
(52) U.S. Cl.
 USPC ...................... 244/45 A; 244/137.1
(58) Field of Classification Search
 USPC ................. 244/45 A, 137.1, 36, 13; D12/331
 See application file for complete search history.

(56) References Cited

U.S. PATENT DOCUMENTS

| | | | | |
|---|---|---|---|---|
| 1,987,050 | A | * | 1/1935 | Burnelli ............................ 244/36 |
| D145,145 | S | * | 7/1946 | Riegel ............................ D12/333 |
| 2,410,234 | A | | 10/1946 | Read et al. |
| 2,459,009 | A | * | 1/1949 | Wallis ............................. 244/36 |
| 2,492,245 | A | * | 12/1949 | Sutton et al. ..................... 244/13 |
| 2,650,780 | A | * | 9/1953 | Northrop et al. ................ 244/13 |
| 2,759,691 | A | * | 8/1956 | Weaver et al. ............. 244/118.3 |
| 3,055,620 | A | * | 9/1962 | Weiland .................... 244/135 A |
| 3,150,849 | A | * | 9/1964 | Conway et al. ........... 244/100 R |
| 3,358,946 | A | * | 12/1967 | Shye ............................... 244/13 |
| 3,572,615 | A | * | 3/1971 | Firestone ......................... 244/13 |
| 3,774,864 | A | * | 11/1973 | Hurkamp ......................... 244/13 |
| 4,636,176 | A | | 1/1987 | Capilla |
| 4,641,800 | A | * | 2/1987 | Rutan ............................ 244/218 |
| 4,848,700 | A | * | 7/1989 | Lockheed .................... 244/45 A |
| 5,435,502 | A | | 7/1995 | Wernicke |
| 5,893,535 | A | * | 4/1999 | Hawley .......................... 244/119 |
| 6,659,394 | B1 | * | 12/2003 | Shenk ........................... 244/7 C |

OTHER PUBLICATIONS

Encyclopedic Index de H-Den—re: "boom".
Britannica\2002\cache\info_000023.html (computer edition), Bleriot, Louis—re: "canard".
Yeager, Jeana & Rutan, Dick, Voyager, Alfred A. Knopf, New York 1987.
Rollo, PH.D., Vera Foster, Burt Rutan—Reinventing the Airplane, p. 135, Maryland Historical Press, Lanham, Maryland 1991.
Lennon, Andy *Canard A Revolution in Filight* Pennsylvania, 1984.
Website: http://www.scaled.com/projects/attt/atttt.htm—re: ATTT.
Website: http://www.air-and-space.com/Rutan.htm—re Quickie.
Website: http://greatplainsas.com/dragon.html.
Sinclaire, Ken—A Course in Airplaine Designing.
Yeager, Rutan, Patton, *Voyager,* Knopf 1987 p. 87.
Website: http://www.337skymaster.com/definat.htm—re The Rutan Defiant Contributed by David Orr.
Wikipedia Website: http://en.wikipedia.org/wiki/Tonya_Rutan—re Burt Rutan.
Website: http://www.337skymaster.com/whatsnew.htm—Skymasters Owners and Pilots Dedicated to C336 and M337 (0-2) Aircraft.
Jack Cox; Burt Rutan's Defiant Flies; EAA Sport Aviation; Aug. 1978; pp. 8-9.
Burt Rutan; Tale of the Three EZ's; EAA Sport Aviation; Feb. 1980; pp. 34-39.

(Continued)

*Primary Examiner* — Tien Dinh

(74) *Attorney, Agent, or Firm* — Sue Z. Shaper

(57) ABSTRACT

A cargo-adapted aircraft, in particular a personal aircraft, comprising a canard having two (and preferably only two) significant horizontal lifting surfaces, the smaller (canard surface) in front of the larger (wing), and having an opening at the rear of the fuselage through which objects can be loaded.

10 Claims, 4 Drawing Sheets

(56) References Cited

OTHER PUBLICATIONS

Jack Cox; Modified Defiant; EAA Sport Aviation; Sep. 1987; pp. 94-95.
Jack Cox; Bayard du Pont's Javeline Ford V-6 Powered Defiant; EAA Sport Aviation; Apr. 1982; pp. 27-34.
Burt Rutan, Quickie-Type Aircraft Design Origins, EAA Sport Aviation; Oct. 1981, pp. 63-68.
Burt Rutan, Effects of Rain or Surface Contamination on Pitch Stability and Control; EAA Sport Aviation; Mar. 1983; pp. 57-60.
Mike Melvill, Solitaire, EAA Sport Aviation; Aug. 1983; pp. 17-24.
Jack Cox; Fred Keller's Defiant, EAA Sport Aviation; Nov. 1983; pp. 52-57.
Jack Cox; A Conversation with Burt Rutan; EAA Sport Aviation; Mar. 1986; p. 23.
Stanley Mohler, Sport Pilot Medicine; EAA Sprot Aviation; Mar. 1987; p. 41.
Dick Caven; Two Easy; EAA Sport Aviation; Jun. 1987; pp. 13-16.
Jack Cox; E-Racer; EAA Sport Aviation; Jan. 1988; pp. 13-20.
Author Unknown; Burt Rutan's Catbird; EAA Sport Aviation; Oct. 1988; pp. 20-25.

\* cited by examiner

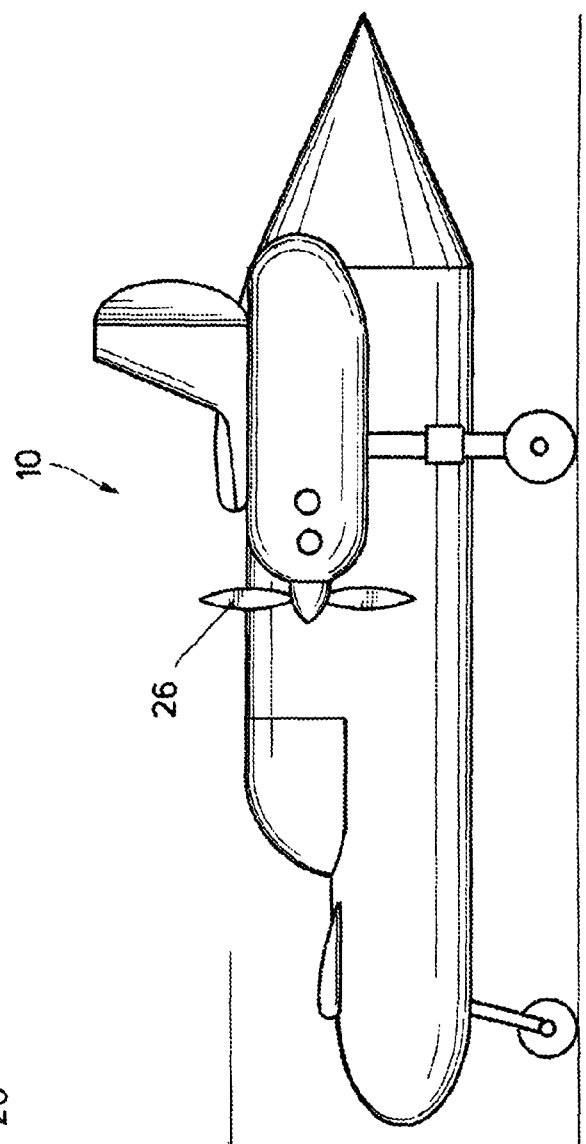
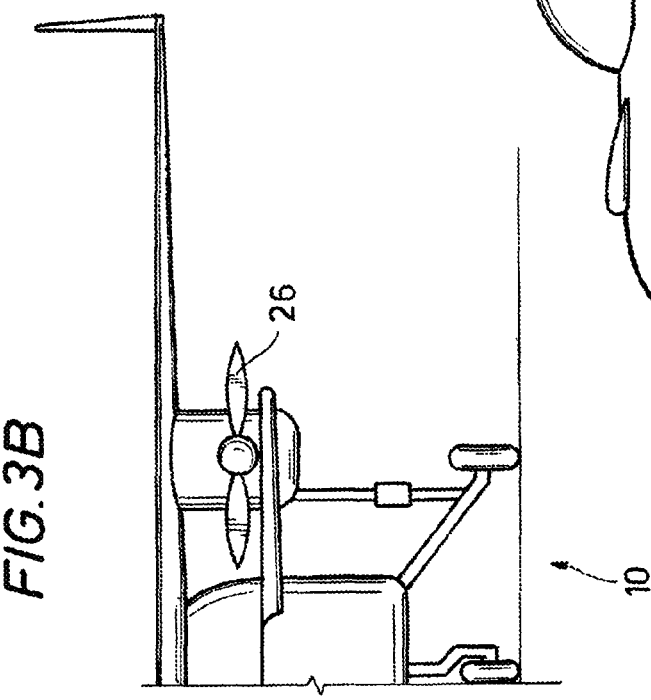
FIG. 3A
FIG. 3B

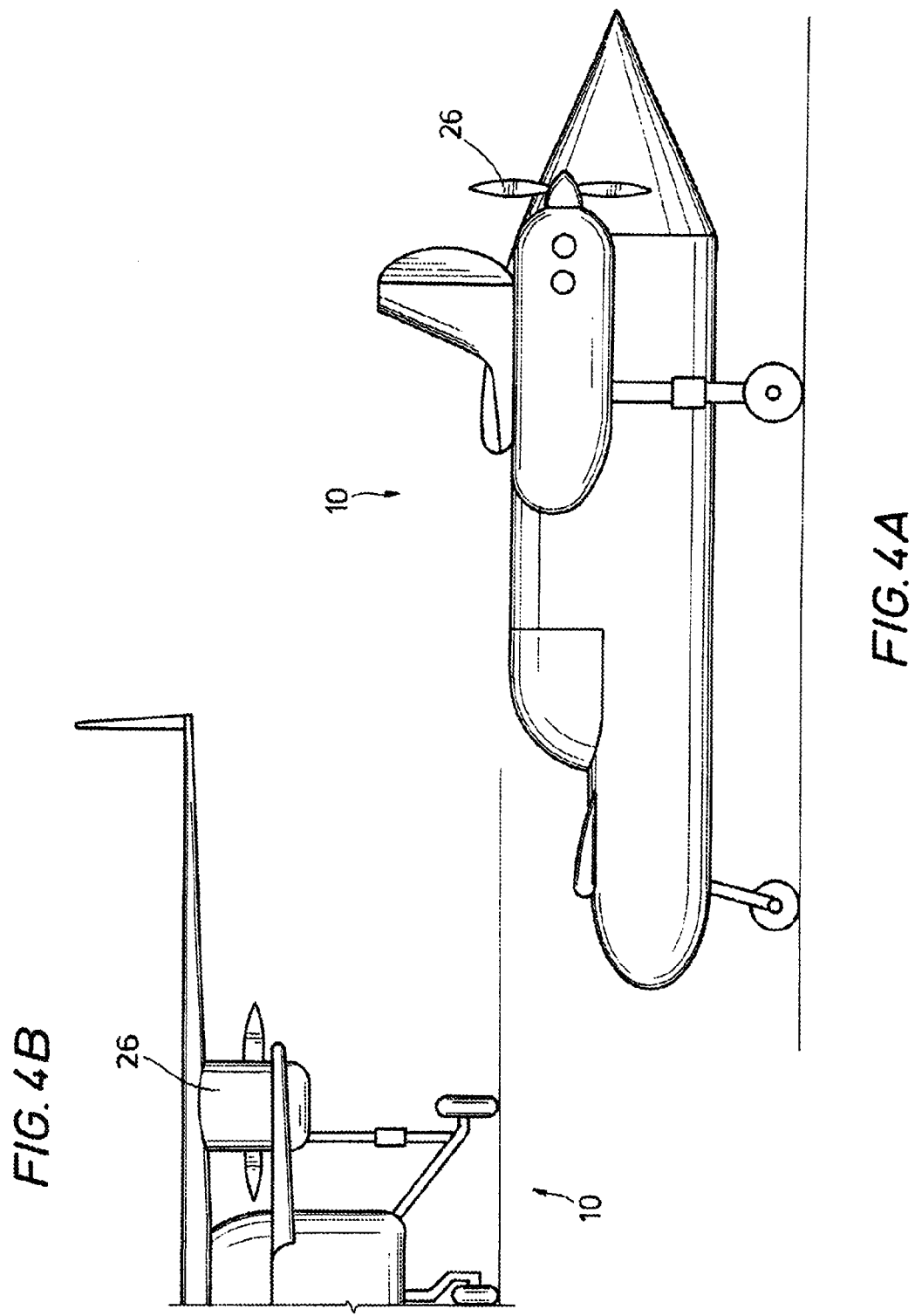

CARGO ORIENTED PERSONAL AIRCRAFT

FIELD OF THE INVENTION

This invention lies in the field of aircraft, in particular a personal aircraft, structured to load large (relatively speaking) cargo, and more particularly, to a canard design with a rear fuselage door.

BACKGROUND OF THE INVENTION

It is well recognized that there are bulky items, such as motorcycles, possibly even small cars, that are within the weight limits of a personal aircraft, in particular, and that could fit inside the fuselage of the aircraft, but which cannot be loaded into the aircraft through the conventional aircraft doors. The instant invention relates to a design for an aircraft, in particular a personal aircraft, that efficiently and cost effectively addresses this problem.

The instant design provides for a rear door into a fuselage of an aircraft for loading bulky items. (Other more conventional side doors, of course, may also be provided.) A ramp from the ground to the rear opening, as part of the aircraft or as part of ground equipment, would enhance convenience. Removable seats might be provided for versatility, to give the option of carrying cargo or people, much in the order of an automobile station wagon, van or utility vehicle.

Rear fuselage doors cannot be provided on conventional personal aircraft because they would interfere with the traditional craft empennage. Conventional personal aircraft all utilize horizontal and vertical control surfaces on the tail, together called the "empennage"[1], which effectively prevent placing a door there. Other designers have recognized this problem and offered solutions which are quite different from the instant invention. Read (2,410,234), for example, suggests removing the empennage from the fuselage and attaching it to the wing(s) utilizing booms. The instant design places the horizontal (pitch) control surfaces on the nose of the aircraft and the vertical (yaw) control surfaces on the wing tips. This is a well-known arrangement, commonly known as a "canard", which has been extensively used by the noted designer Burt Rutan.

[1] Empennage is a French word meaning "tail feathers". Empennage referred originally to the feathers (pennage) affixed to the end (em) of an arrow. Webster says "empennage" means "the tail assembly of an airplane". We use the word to cover a rear horizontal lifting surface of an airplane, attached to either fuselage or "booms". The instant inventive aircraft has no empennage at all of any kind just a preferably cone-shaped door where the empennage would be.

The instant invention is novel (unique) in that it is the first to combine a rear door with the canard configuration.

The instant invention, in contrast to convention, discloses a two-surface canard design for aircraft which eliminates the conventional aircraft empennage, enabling the placement of a large rear fuselage door. The design also avoids adding the weight, complexity and expense of a tail empennage having a horizontal lifting surface carried between boom structures.

In particular, the canard design of the instant invention, by providing two and only two horizontal lifting surfaces, the smaller in front of the larger, avoids the expense and weight of providing a third horizontal lifting surface and/or the expense and weight of a boom-supported horizontal lifting surface associated with the empennage.

The horizontal lifting surfaces of the instant invention, together with the engine(s) or means for propulsion, can be located with respect to the fuselage and weight can be managed to satisfy aerodynamic concerns for stability and efficiency. Thus, the instant invention discloses an efficient, cost effective design for an aircraft, in particular a personal aircraft, to permit the loading of bulky items, such as a motorcycle, while minimizing expense, complexity and weight.

SUMMARY OF THE INVENTION

The instant invention comprises a unique type of aircraft, in particular a unique personal aircraft. The uniqueness involves the combination of two features. To the inventor's knowledge, no aircraft embodying this combination of features has been designed or built by another. Such design fills an important need and has wide application.

The first feature is that the aircraft has two and only two significant horizontal lifting surfaces, with the smaller in front of the larger. A design with a smaller horizontal lifting surface in front of a larger is commonly referred to as a "canard" design. The small in-front horizontal lifting surface is sometimes referred to as "the canard surface". The larger horizontal lifting surface is referred to as the wing.

The instant invention further specifies two and only two significant horizontal lifting surfaces, with the smaller in front of the larger, e.g. a "two-surface" canard, together with an opening at the rear of the fuselage through which large objects (relatively speaking) can be loaded. The opening will be closed by some type of door or closure means while in flight. "Large objects" for a personal aircraft could refer to such things as a patient on a gurney, a man in a wheelchair, a coffin (aka a casket), a motorcycle, a four-wheeled vehicle such as a golf cart or ATV, a sheet of plywood, etc., any of which could be carried by a typical small private plane, under its volume and weight limitations, if only it could be loaded aboard, which is not possible with conventional personal aircraft designs.

The fact that the canard of the instant inventive design has no conventional tail or conventional empennage makes it possible to put a large rear door on the fuselage. That is the novel combination of two features that has not been done before.

Prior "canard" designs for cargo-oriented craft that incorporated a rear fuselage door, the only known design being the Rutan ATTT, have utilized three horizontal lifting surfaces, including a boom-supported tail empennage. The Read '234 design for cargo aircraft is not a canard. Also Read teaches a boom-supported horizontal lifting surface in the empennage. Neither of the above designs, therefore, are according to the instant inventive design.

To summarize, no known two-surface canard design for an aircraft, in particular a personal aircraft, is known to have a rear fuselage door. No known personal aircraft with a rear door has been a two-surface canard.

Other features of the instant design, such as the engine(s), landing gear, roll control, etc. are conventional, but can and should be selected and located to enhance the efficiency and cost effectiveness of the personal aircraft. The preferred yaw control is not conventional, because there is no conventional "tail", where a rudder is usually placed. However, nose rudders, wing-tip air brakes, or boom rudders (as on the Rutan "Voyager") are all possible yaw controls that have been used successfully on canard designs.

The personal aircraft shown in the instant drawing of a preferred embodiment uses wing-tip air brakes mounted on winglets for yaw control, probably the most typical arrangement on canards. The drawing shows a single tractor propeller, but there are many other possibilities. Twin jets would be equally feasible and a lot faster, but also a lot more expensive. Twin jets could be wing- or fuselage-mounted, preferably the latter.

The personal aircraft design shown in a preferred embodiment utilizes a modular cargo container, 10'×5'×4', but that is not necessary to the design. The useful load of the aircraft shown, with a 300-hp engine, would be about a thousand pounds, including fuel. The motorcycle is shown only as an example of possible cargo.

Note that the "winglets," shown in the drawing of a preferred embodiment are not necessary to the design. They are optional, used to improve performance, like flaps. Roll control is by conventional ailerons. Pitch control is by elevators on the canard surface but could be by pivoting the canard surface itself, both of which methods are commonly used. Landing gear is preferably a conventional tricycle.

For comparison purposes, a Piper "Cherokee Six", of which hundreds have been flying for at least thirty years, is essentially the same size, power, weight, and speed as envisioned by a to preferred embodiment of the instant invention, and can easily carry the weight of any of the items mentioned above, but none of them can be loaded into the Cherokee Six because the door is on the side, designed only for passengers and small baggage. As an analogy, the "Cherokee Six" is like a sedan while the instant design is like a station wagon, with a large rear door.

Also, like a station wagon, the instant design could also have optional additional rear is seats, so that it could be converted to carry six people—like a "Cherokee Six". Again, that is not necessary to the design.

A prime benefit of the instant design is that it permits a large rear fuselage cargo door without requiring a boom-supported empennage (Read) (Rutan ATTT), and without employing a third significant horizontal lifting surface. The instant solution to the problem—loading large objects—is an elegant improvement over prior solutions, being cheaper, simpler, lighter, faster, smaller, etc. The design of a preferably two-surface canard configuration for a personal aircraft to provide a large cargo door at the rear is startling in its simplicity, elegance and utility.

BRIEF DESCRIPTION OF THE DRAWINGS

A better understanding of the present invention can be obtained when the following detailed description of the preferred embodiments are considered in conjunction with the following drawings, in which:

FIGS. 3 and 4 illustrate canards with two engines, each mounted on a wing. FIG. 3 illustrate tractor engines and FIG. 4 illustrate pusher engines.

DETAILED DESCRIPTION OF THE PREFERRED EMBODIMENT

A "canard" is sometimes referred to as a "tail-first" aircraft. The term "two-surface" canard is used herein to refer to an aircraft having two, and only two, significant (i.e. non trivial, non de minimus) horizontal lifting surfaces (independent of the fuselage and any booms, to the extent they could be said to offer a lifting surface,) with the smaller lifting surface (the canard surface) in front (of the wing). (Herein, left and right wings divided by a fuselage are referred to as one horizontal lifting surface. Similarly, left and right canard surfaces will be regarded as a single horizontal lifting surface for purposes of discussion and description herein.)

A rear door refers to a rear closing means. Preferably, such a door would be hinged at one or two sides, or from above or below. It might be hinged on four sides. Many other means for closure of openings are known and would be operable. The door might incorporate or facilitate a ramp.

For purposes herein, a light personal aircraft will refer to an aircraft designed for one to two occupants and with a gross weight limit of 1,500 pounds and horse-power of less than or equal to 150 hp. A personal aircraft will refer to an aircraft designed for six or less occupants and with a gross weight limit of 5,000 pounds and a horsepower of less than or equal to 500 hp.

Yaw control surfaces typically comprise rudders, air brakes on winglets or the like.

The foregoing description of preferred embodiments of the invention is presented for purposes of illustration and description, and is not intended to be exhaustive or to limit the invention to the precise form or embodiment disclosed. The description was selected to best explain the principles of the invention and their practical application to enable others skilled in the art to best utilize the invention in various embodiments. Various modifications as are best suited to the particular use are contemplated. It is intended that the scope of the invention is not to be limited by the specification, but to be defined by the claims set forth below.

Figure 1A:
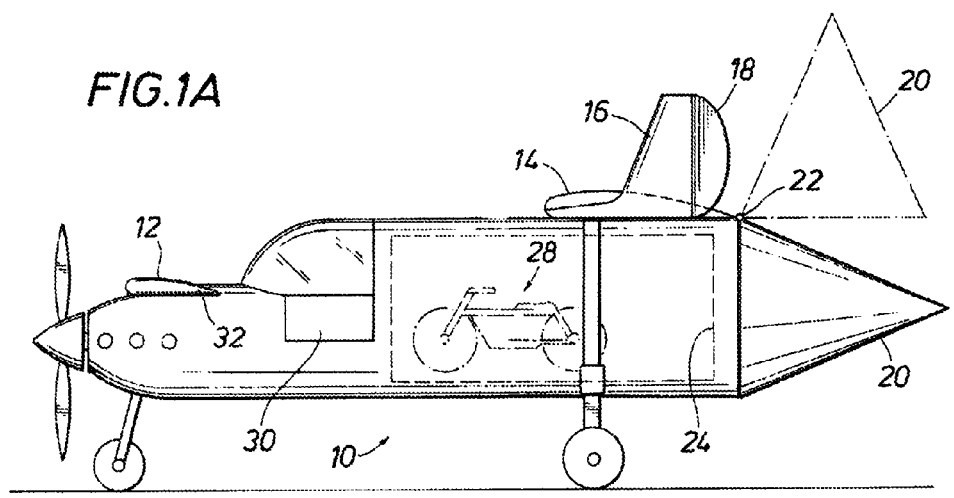
FIG. 1 illustrate a preferred embodiment of the instant invention.
Figure 1B:
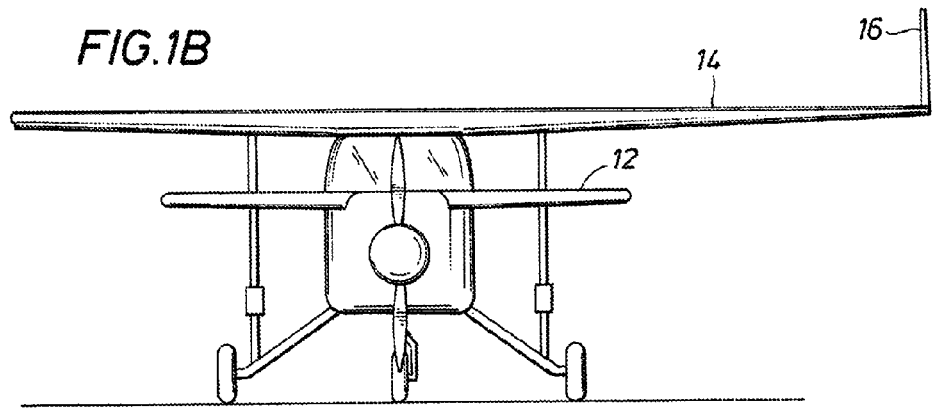
Figures 1C, 2:
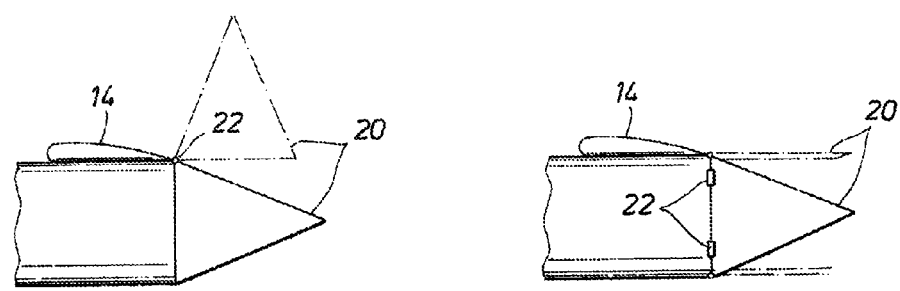
FIG. 2 illustrates an alternate tail design.

FIGS. 1A, 1B and 1C illustrate a preferred embodiment of the instant invention. (It should be understood that for production models of the aircraft, an aerodynamic design of the fuselage shape and the relative locations of the wing, the canard surface, and the engine or engines would be optimized using aerodynamic principles and programs in order to optimize the center of gravity, weight and balance, and taking into account flying with minimum loading and with maximum loading.)

FIGS. 1A and 1B illustrate a side and front view of a preferred embodiment of the instant inventive aircraft 10. One tractor engine 26 is shown on the front of the aircraft. However, a pair of engines could be located on wing 14, as is known in the industry. Canard surface 12 is shown in front of wing 14. Door 20, illustrated in both open position and closed position for flight, is shown pivoting over an upper hinge 22. Again, any number of door types and closure arrangements could be utilized. Relatively large and bulky motorcycle 28 is shown loaded in the fuselage of aircraft 10. Motorcycle 28, in fact, is shown loaded into a modular container 24 that sits within the fuselage of craft 10. Wings 14 are illustrated having winglets 16 and moveable airbrakes 18 located on the winglet. Canard surface 12 may include a moveable elevator 32. Tricycle landing gear are standard. The cockpit is shown with a standard pilot-side opening door 30.

FIG. 2 is to be contrasted with FIG. 1C. FIG. 1C illustrates a unitary cone-shaped tail door 20, closed for flight and opened to load. With such unitary tail design, opening of the tail in flight would be difficult if not impossible. Note that the base of such a cone-shaped tail door need not be circular. It is anticipated, in fact, that the base of a cone-shaped tail door of the design illustrated in FIG. 1C would be roughly rectangular.

FIG. 2, in contrast, illustrates a tail "cone" door 20 that is divided into parts, in fact four parts. If the base of the tail cone (assembled or closed) were roughly rectangular, each part could divide itself into one side of the rough rectangle, as indicated. Such a tail door 20 of the design of FIG. 2 could not only be closed for flight and open on the ground but also could be opened during flight. Whereas it would be difficult if not impossible to open the single-piece tail door design of FIG. 1C, the four-sided tail door of FIG. 2 would permit contents to be pushed out of an aircraft in flight. Contents such as a container, a raft, people, food supplies, a vehicle, etc. could be dropped to the ground during flight, with or without a parachute or parachutes.

Figure 3C:
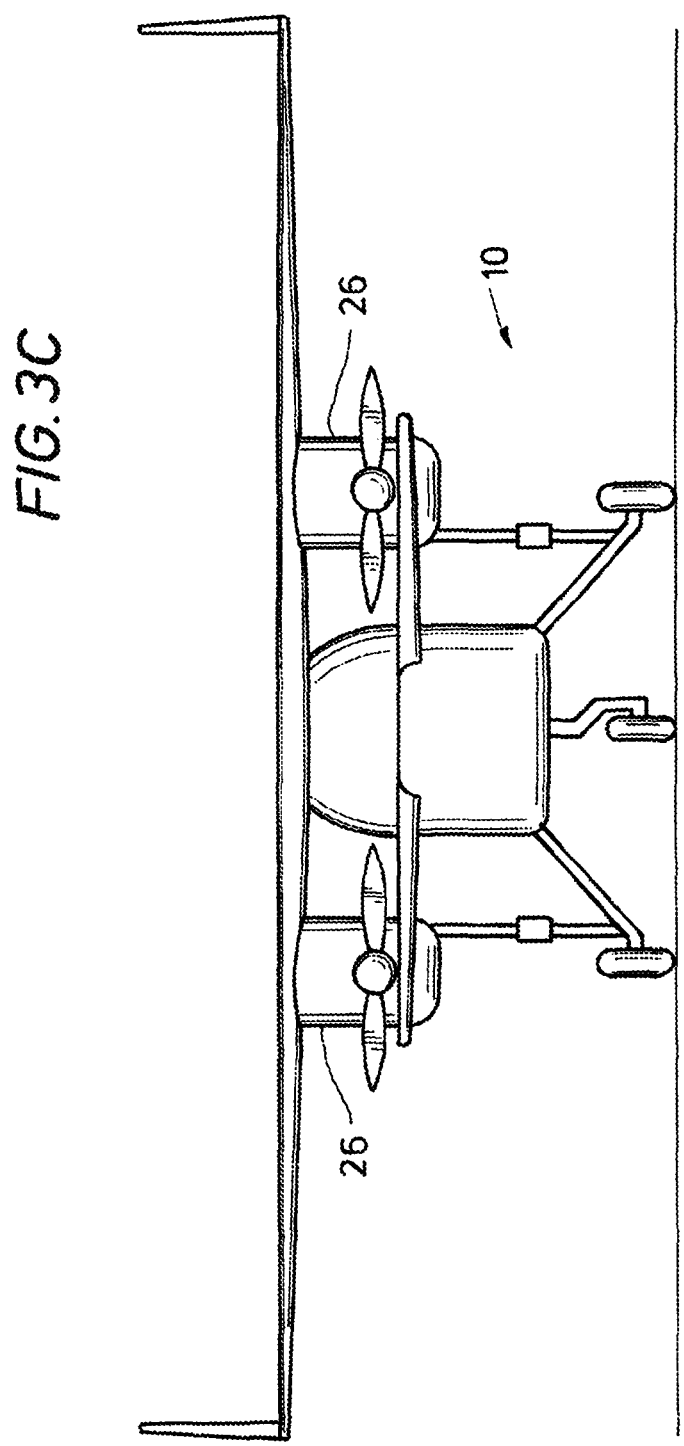

FIGS. 3 and 4 illustrate a pair of engines 26 located on wing 14.

The foregoing disclosure and description of the invention are illustrative and explanatory thereof, and various changes in the size, shape, and materials, as well as in the details of the illustrated device may be made without departing from the spirit of the invention. The invention is claimed using terminology that depends upon a historic presumption that recitation of a single element covers one or more, and recitation of two elements covers two or more, and the like. Also, the drawings and illustration herein have not been produced to scale. The limitation of two and only two horizontal lifting surfaces should be understood to refer to significant lifting surfaces, not trivial or deminimus or insignificant horizontal lifting surfaces, as might be added to avoid the patent.

In the following claims, when discussing a canard having two and only two significant lifting surfaces, with a smaller lifting surface in front of a larger lifting surface, it should be understood that the smaller lifting surface is usually and frequently referred to as a "canard surface." The larger lifting surface is usually and frequently referred to as a "wing."

What is claimed is:

1. A cargo adapted personal aircraft, comprising:
a two-surface canard having two and only two significant horizontal lifting surfaces, with a smaller lifting surface in front of a larger lifting surface;
having no empennage; and
a large opening at the rear of the fuselage through which large objects, including at least one of a motorcycle, a patient on a gurney and a man in a wheelchair can be loaded, the opening having a closure for flight, the personal aircraft having a gross weight limit of up to 5000 pounds and a hp limit of up to 500 hp.

2. A cargo adapted personal aircraft, comprising:
a two-surface canard having two and only two significant horizontal lifting surfaces with a smaller lifting surface in front of a larger lifting surface;
including yaw control surfaces on the larger lifting surface;
having no empennage; and
a large opening at the rear of the fuselage through which large objects, including at least one of a motorcycle, a patient on a gurney and a man in a wheelchair can be loaded, the opening having a closure for flight, the personal aircraft having a gross weight limit of up to 5000 pounds and a hp limit of up to 500 hp.

3. The aircraft of claim 1 or 2 wherein the aircraft is a light personal aircraft.

4. The aircraft of claim 1 or 2 wherein the large opening is at least 5 feet high by 4 feet wide.

5. The aircraft of claim 1 or 2 that includes one tractor engine.

6. The aircraft of claim 1 or 2 that includes two engines located on the larger lifting surface.

7. The aircraft of claim 1 or 2 without a boom-supported empennage.

8. The aircraft of claim 1 or 2 including a pitch control surface on the smaller horizontal lifting surfaces.

9. A cargo-adapted personal aircraft, comprising:
a two-surface canard having two significant horizontal lifting surfaces with a smaller lifting surface in front of a larger lifting surface;
a large opening, at the rear of the fuselage through which objects, including at least one of a motorcycle, a patient on a gurney and a man in a wheelchair, can be loaded, the personal aircraft having a gross weight limit of up to 5000 pounds and a hp limit of up to 500 hp; and
having no empennage.

10. The aircraft of claim 9 including power sources and yaw control surfaces, all said power sources and yaw control surfaces being attached to the aircraft at a location at least as far forward as the larger lifting surface.

* * * * *